United States Patent Office 3,836,635
Patented Sept. 17, 1974

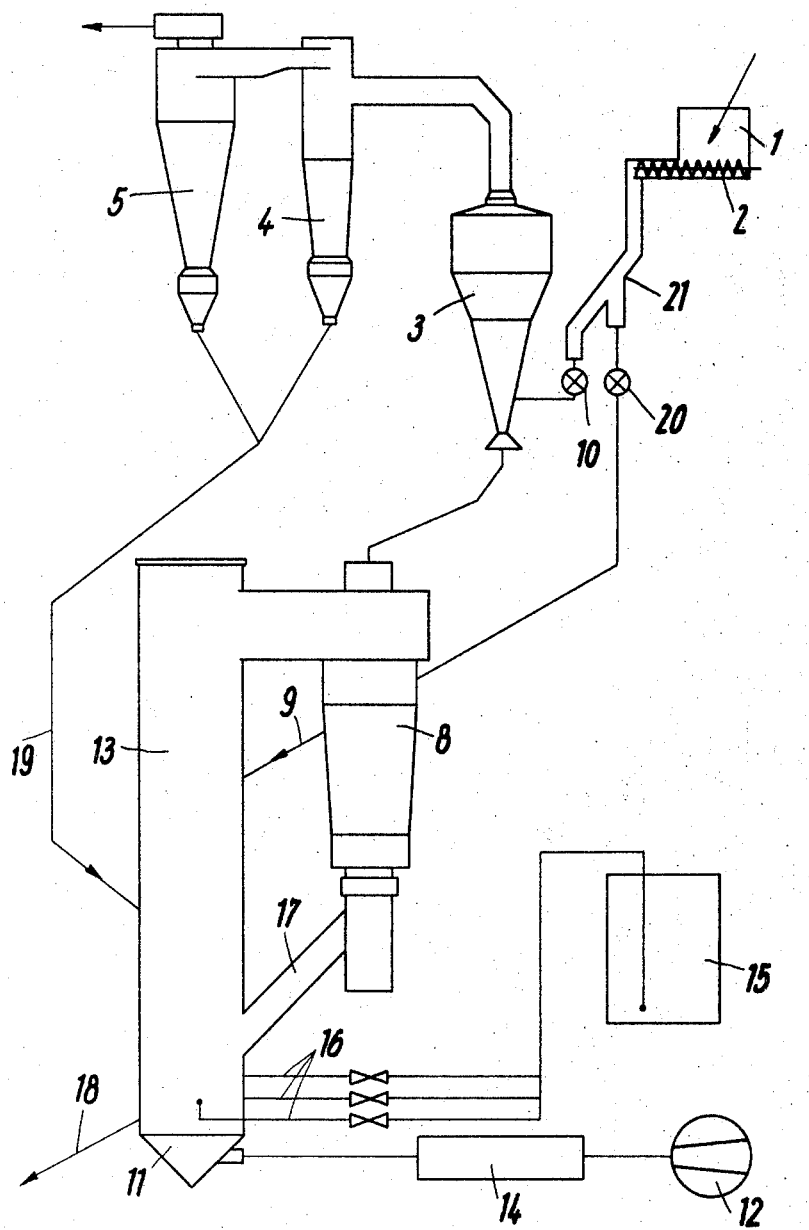

3,836,635
PROCESS FOR PRODUCING ALUMINUM FLUORIDE
Lothar Reh, Bergen Enkheim, Eberhard Bohm, Frankfurt am Main, and Gunter Schoene, Kelsterbach, Germany, assignors to Metallgesellschaft Aktiengesellschaft, Frankfurt am Main, Germany
Filed Jan. 5, 1972, Ser. No. 215,611
Claims priority, application Germany, Feb. 10, 1971, P 21 06 306.9
Int. Cl. C01f 7/50
U.S. Cl. 423—489                    6 Claims

ABSTRACT OF THE DISCLOSURE

Aluminum fluoride is produced from hydrogen fluoride and aluminum hydroxide or hydrated alumina in an expanded fluidized bed. A solid gas mixture is discharged at the top of the bed and the solids therein are separated and recycled into the fluid bed. Liquid hydrogen fluoride is supplied directly to the fluid bed above the bottom grate thereof but below the point where the solids are recycled into the bed.

BACKGROUND

This invention relates to a process of producing aluminum fluoride from aluminum hydroxide or hydrated alumina and hydrogen fluoride in an expanded fluid bed.

Aluminum fluoride may be produced from fluorine-containing materials by a reaction with mineral acids and subsequent crystallization (Published German Application 1,062,681), or by a double reaction of fluorine compounds and aluminum chloride (Austrian Pat. 130,199; German Pat. 837,690; U.S. Pat. 1,881,430), or by a reaction of alumina or hydrated alumina with aqueous hydrofluoric acid (German Pat. 1,220,839; Published German Applications 1,592,099; 1,592,100; 1,592,195; U.S. Pat. 3,492,086), or by a decomposition of aluminum alcoholates by a treatment with acids (Published German Application 1,294,358). In addition to these processes, those in which hydrated aluminum hydroxide or aluminum hydroxide and hydrogen fluoride are used are particularly significant. The reaction may be carried out in an aqueous phase and may be succeeded by crystallization and, if desired, dewatering (German Pat. 492,412). Alternatively, the reaction may be carried out at elevated temperatures so that dry aluminum fluoride is produced by the process (British Pat. 328,688). These processes may be carried out in a fluidized bed in which alumina or aluminum hydroxide is reacted with hydrogen fluoride gas at elevated temperatures (German Pats. 815,343; 1,092,889; British Pat. 656,374; French Pats. 1,011,544; 1,221,299; 1,517,952; U.S. Pat. 3,057,680). A multistage process of producing aluminum fluoride from alumina trihydrate and partly dehydrated alumina trihydrate together with hydrogen fluoride-containing gas is described in the Published German Application 1,908,585; Published French Application 2,002,335; and Canadian Pat. 537,403.

Of the processes which have been described hereinbefore those which comprise a crystallization and drying of the aluminum fluoride necessarily include a plurality of stages so that they require expensive equipment. Besides, the sewage problems are severe or solvent must be recirculated at a high rate. In all fluidized-bed processes, the hydrogen fluoride is introduced as a gas through a gas-distributing bottom into the fluidized bed, which consists of one or more stages. The gaseous hydrogen fluoride may be formed from highly concentrated hydrofluoric acid by evaporation or directly as a gaseous product of the reaction of calcium fluoride and sulfuric acid. The evaporation of acid in indirectly heated evaporators results in an enriching of the water, which cannot be completely removed from the hydrogen fluoride so that a sump of dilute hydrofluoric acid is formed, which must be regularly removed from the evaporator. The evaporating equipment is subjected to corrosion by the fluosulfonic acid which is contained in the hydrofluoric acid. When hydrogen fluoride gases are withdrawn directly from the hydrogen fluoride reactor, dust and sulfuric acid droplets are inevitably entrained from the reaction drum so that impurities such as silicates, sulfates enter the aluminum fluoride. Any blowers used to handle such gases are highly liable to be deranged because dust, sulfuric acid droplets fluosulfonic acid and hydrogen fluoride result in difficulties in operation.

SUMMARY

The known disadvantages are avoided by the invention. A process is provided which can be carried out with inexpensive equipment and with a high throughout per unit of volume of the reactor. This process results in a formation of pure aluminum fluoride in one operation and involves virtually no losses of hydrogen fluoride. In the process of producing aluminum fluoride from aluminum hydroxide or hydrated alumina and hydrogen fluoride in an expanded fluid bed the solids are discharged together with the gases at the top of the fluid bed and are separated from the gas and recycled at least in part into the fluid bed, and at least part of the heat is supplied in the form of hot combustion gases, and this process is characterized according to the invention in that the hydrogen fluoride is supplied in liquid form directly to the fluid bed above the bottom grate 11 but below the point where the solids are recycled into the bed.

In this process the aluminum hydroxide or the alumina is preferably dehydrated by treatment with hot discharged gases which are at a temperature of 120–350° C.

DESCRIPTION OF THE DRAWING

The accompanying drawing illustrates preferred apparatus for carrying out the process of the invention.

DESCRIPTION

Dehydration is suitably carried out in a Venturi-type fluidized-bed dryer which precedes the fluid-bed reactor.

In a development of the invention, the aluminum hydroxide or hydrated alumina is fed to the fluid-bed reactor in two partial streams and the ratio between the rate at which solids are fed directly to the fluid-bed reactor and the rate at which solids are fed to the fluid-bed reactor indirectly through the Venturi-type fluidized-bed dryer is adjusted so that a temperature of 450–550° C. is maintained in the fluid-bed reactor and a temperature of 250–300° C. is maintained in the Venturi-type fluidized-bed dryer.

The gas velocity in the fluid-bed reactor is preferably selected so that the mean solids concentration is 10–100 kilograms per cubic meter. In this case the gas velocities are about 0.5–3 meters per second. The use of a Venturi-type fluidized-bed dryer for dewatering the aluminum hydroxide or hydrated alumina affords the additional advantage that said dryer acts as a second reactor stage and substantially reduces the content of hydrogen fluoride in the exhaust gas.

The dispersion of solids in the fluid-bed furnace is due to the fluidizing air supplied through the grate and the water vapor formed by the reaction by the hydrogen fluoride with hydrated alumina. An expanded fluid bed is formed, which has a mean solids concentration of about 10–100 kilograms per cubic meter, depending on the circulation of solids in the furnace.

The aluminum fluoride which is discharged from the fluid-bed furnace together with the gas stream has a temperature of about 400–600° C. and is collected in a recycling cyclone. In a preferred embodiment of the process, the exhaust gases from the recycling cyclone are supplied at the same temperature into a Venturi-type fluidized-bed dryer, in which they dehydrate the aluminum hydroxide or hydrated alumina with substantially complete utilization of the heat content. At least one cyclone for a collection of solids is associated with the Venturi-type fluidized-bed dryer. The use of the Venturi-type fluidized-bed dryer is desirable because it can easily be controlled and has good heat exchange and material exchange properties.

In the Venturi-type fluidized-bed dryer, a suspension is formed which rises from the bed and is treated in at least one cyclone. The collected solids are carried into the fluid-bed furnace.

The aluminum fluoride which is formed in the fluid-bed reactor and discharged through the top of the furnace and finally collected in the recycling cyclone is entirely or partly returned into the fluid bed of the fluid-bed furnace. The product of the process is removed from the recycling cyclone or from another suitable point, e.g., the fluid-bed furnace, in a controlled manner and is cooled.

Coolers known per se may be used for cooling.

The heat required for the evaporation of the liquid hydrogen fluoride is supplied by the heat generated by the reaction with previously dewatered aluminum hydroxide or hydrated alumina. The procedure has the advantage that the hydrofluoric acid is heated virtually instantaneously through the temperature range of 60–250° C. which is critical as regards corrosion, and is heated immediately to the temperature of about 400–600° C. in the fluid bed. The dispersion of the hydrogen fluoride in the fluid bed may be improved by a partial evaporation of the hydrogen fluoride in a continuous-flow evaporator which precedes the injection lance because the vapor content increases the exit velocity of the hydrogen fluoride from the lance and consequently the depth of penetration into the fluid bed.

To meet the heat requirement of the process, additional heat must be supplied in the form of hot flue gases. This will result in a simple heating-up of the plant and has the advantage that the plant can be kept in a stand-by condition when the supply of hydrogen fluoride is interrupted.

The invention will be explained more fully with reference to the drawing and the following example.

Air which has been heated in a combustion chamber 14 is blown by a blower 12 into a cylindrical fluid-bed furnace 13 through a grate 11 with such a velocity that a fluid bed is formed. Liquid hydrogen fluoride at a rate which depends on the rate at which aluminum hydroxide or hydrated alumina is supplied is fed into the hot fluid bed from a tank 15 by a pump through a plurality of conduits 16, which are provided with injection lances. The evaporation of the hydrogen fluoride and the water vapor formed by the reaction cause the fluid bed to expand to such an extent that it fills the furnace completely whereas its solids concentration decreases in an upward direction.

The solids discharged at the top of the shaft are collected in a recycling cyclone 8 and are recycled by a conduit 17. The resulting aluminum fluoride is discharged at 18 in such a manner that a predetermined pressure loss and, for a given solids throughput rate, a constant mean residence time of the solids are maintained.

The gases which leave the recycling cyclone 8 still contain small amounts of hydrogen fluoride and are cooled in a Venturi-type fluidized-bed dryer 3. For this purpose, dried aluminum hydroxide is used or hydrated alumina which has previously been dewatered to an ignition loss of preferably 25–30%. Dust particles smaller than 5 microns have been removed from either material. The bed material is introduced through a valve 10 and cools the gases and removes most of the hydrogen fluoride therefrom. The solids preheated to the same temperature are discharged together with the exhaust gases into the cyclones 4 and 5 and are collected there and through the conduit 19 are supplied to the fluid-bed furnace. The exhaust gases still contain small amounts of hydrogen fluoride and enter a gas purifier, preferably a two-stage wet scrubber (not shown), where residual hydrogen fluoride and residual very fine dust are removed.

Because the losses of hydrofluoric acid are of decisive significance for the economy of the process, the aluminum hydroxide or hydrated alumina having a defined ignition loss is supplied at a metered rate from a bin 1 by means of a weighing and metering belt conveyor 2, which controls the supply rate of the hydroxide or hydrated alumina so that there is a stoichiometric ratio between said rate and the rate at which hydrogen fluoride is injected at 16; this ratio will depend on the fluorine content which is desired in the product. By means of a distributing device 21, which consists of a chute, an adjustable deflector or a rotary distributor, and of an additional valve 20, a partial stream of the hydroxide or hydrated alumina which has been supplied may be charged directly into the fluid-bed furnace 13 to control the temperature therein.

EXAMPLE

A fluidized-bed furnace having a height of 9 meters and an inside diameter of 1.25 meters is used.

At a rate of 1260 kilograms per hour, aluminum hydroxide which has been predried to an ignition loss of 30% is withdrawn from a supply bin 1 by means of a metering screw conveyor 2. With a ratio of 4:1, the solids are charged by means of a distributing chute 21 and two star feeders 10 and 20 partly to the Venturi-type fluidized-bed dryer 3, which is disposed over the fluid-bed furnace 13, and partly directly to the fluid-bed furnace 13. The star feeders provide a seal which resists the superatmospheric pressure in the fluid-bed furnace and enable an adjustment of any desired ratio between the rates at which the solids are charged to the fluid-bed furnace and to the Venturi-type fluidized-bed dryer. The star feeder 10 for feeding the Venturi-type fluidized-bed dryer 3 is speed-controlled and determines the proportion of the hydroxide which is fed there. The remaining hydroxide is fed through the supply conduit 9 into the fluid-bed furnace 13.

The hydroxide entering the Venturi-type fluidized-bed dryer is entrained by the exhaust gas from the fluid-bed furnace 13. The exhaust gas is at a temperature of 530° C., which prevails also in the fluid-bed furnace. The heat content of the exhaust gas stream results in a dehydration of the hydroxide so that the stream of gas and entrained solids assumes a temperature of about 280° C. In the succeeding cyclones 4 and 5, the entrained dehydrated solids are separated from the exhaust gas, which is then subjected to wet or dry gas purification.

The solids from the Venturi-type fluidized-bed dryer are charged through a supply conduit 19 into the fluid-bed furnace 13 at a point about 4 meters above the grate 11. The stream of directly charged starting material enters through conduit 9 about 7 meters above the grate 11.

In the fluid-bed furnace 13, the solids react with hydrogen fluoride which is supplied in liquid form and evaporates at the high temperature. The reaction is carried out at a temperature of 530° C. and results in the formation of aluminum fluoride. The fluidizing gases entrain the solids to the top of the fluid-bed furnace 13. The entraining gases still contain hydrogen fluoride and enter the recycling cyclone 8, where they are separated from the solids and in the Venturi-type fluidized-bed dryer 3 meet the fresh hydroxide which is supplied. In the dryer 3, the solids deliver most of their residual hydrogen fluoride content to the feed material with formation of aluminum fluoride.

The solids which have been collected in the recycling cyclone 8 are at a temperature of about 530° C. and are conducted through a recycling conduit 17 back to the fluid-bed furnace 13, to which they are fed at a point which is about 3 meters above the grate 11. This recycling of the solids results in a circulation of the fluid-bed in the reaction zone, which is at a temperature of 530° C. The resulting means residence time of the solids is about 45 minutes.

The hydrofluoric acid required for the reaction contains 98% by weight HF and is supplied at a metered rate of 930 kilograms per hour from the tank 15 by an immersion pump and at a temperature of 15° C. and directly enters the fluid-bed furnace 13 through three conduits 16, which are provided with valves and float-operated flowmeters. The hydrofluoric acid is immediately evaporated as it enters the furnace 13. The lances at the ends of the supply conduits 16 for hydrofluoric acid are spaced about 550 millimeters above the grate 11 and regularly spaced around the periphery of the fluid-bed furnace. An exact ratio between the supply rates of hydrogen fluoride and hydroxide may be maintained if the metering devices for aluminum hydroxide and hydrogen fluoride are coupled by an automatic control system. In this case, the measured rate at which hydrogen fluoride is supplied is used as a manipulated variable and the rate at which aluminum hydroxide is supplied—this rate is measured by the metering screw conveyor 2—is used as a controlled variable.

The heat produced by the reaction is not sufficient to supply the heat required for the evaporation and to compensate for the heat losses. For this purpose, the air which is supplied to the fluid-bed furnace through the grate 11 and used to fluidize the fluid-bed is preheated to 700° C. in the combustion chamber 14 by the combustion of sulfur-free fuel oil at a rate of 17.5 kilograms per hour. The air is supplied to the fluid-bed furnace 13 at a rate of 800 standard cubic meters per hour and in conjunction with the water vapor formed by the reaction results in the fluid-bed furance 13 in a gas velocity of 1.2 meters per second.

A fluid bed having a high solids concentration is formed in the lowermost zone of the furnace between the grate 11 and the inlet for the hydrogen fluoride solution. The product is continuously withdrawn from said fluid bed by a metering screw conveyor through a conduit 18 and by means of a star feeder is supplied to a cooler (both parts are not shown). The star feeder constitutes a safety element, which prevents a shooting of the solids through the metering screw conveyor.

The aluminum fluoride is discharged at 18 and is cooled in a drum cooler (not shown), which is cooled with water. The exhaust gas from the cyclone 5 is purified in a two-stage wet scrubber (not shown).

The aluminum fluoride is formed at a rate of 1360 kilograms per hour and has a purity of 92%. The impurities consist mainly of $Al_2O_3$. The yield related to the supplied hydrogen fluoride is 98%.

What is claimed is:

1. In a process for producing aluminum fluoride from hydrogen fluoride and aluminum hydroxide or hydrated alumina in an expanded fluid bed wherein the solids are discharged with the gases at the top of said bed and separated from said gases and recycled at least in part into said fluid bed, and at least part of the heat supplied to said fluid bed is in the form of hot combustion gases, the improvement which comprises supplying hydrogen fluoride in liquid form directly to the fluid bed above the bottom grate thereof but below the point where said solids are recycled into said bed.

2. Process of claim 1 wherein at least a portion of the aluminum hydroxide or hydrated alumina is dehydrated before entering said bed by treatment with said discharged gases at a temperature of 120–350° C. after said solids are separated therefrom.

3. Process of claim 2 wherein the dehydration is carried out in a Venturi-type fluidized bed dryer.

4. Process of claim 3 wherein the ratio of undehydrated aluminum hydroxide or hydrated alumina being fed directly to the fluid bed and being fed indirectly to the fluid bed via Venturi-type fluidized bed dryer is selected such that a temperature of 450–550° C. is maintained in said fluid bed and a temperature of 250–300° C. is maintained in said Venturi-type fluidized bed dryer.

5. Process of claim 1 wherein the gas velocity in said fluid bed is controlled such that the mean solids concentration is from 10–100 kilograms per cubic meter.

6. Process of claim 5 wherein the gas velocity is from 0.5 to 3 meters per second.

References Cited

UNITED STATES PATENTS

| | | | |
|---|---|---|---|
| 2,996,354 | 8/1961 | LaCroix | 423—489 |
| 3,057,680 | 10/1962 | Schytil et al. | 423—489 |
| 3,272,592 | 9/1966 | Gortsema et al. | 423—489 |
| 3,278,265 | 10/1966 | Quarles | 423—485 |
| 3,473,887 | 10/1969 | Chu et al. | 423—495 |

FOREIGN PATENTS

| | | | |
|---|---|---|---|
| 505,199 | 8/1954 | Canada | 423—489 |
| 1,143,880 | 2/1969 | Great Britain | 423—629 |

EDWARD STERN, Primary Examiner

U.S. Cl. X.R.

423—135, 629, 659